April 20, 1965   P. C. KESLING   3,178,821
ORTHODONTIC APPLIANCE
Filed April 30, 1962
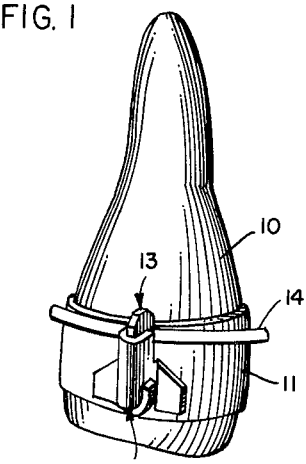
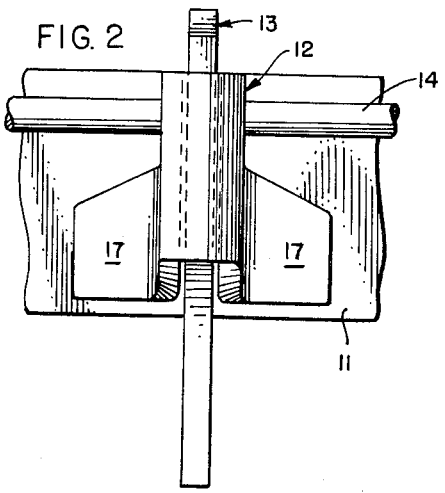
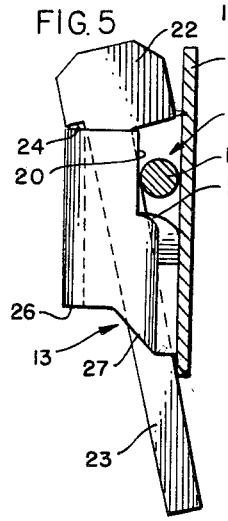
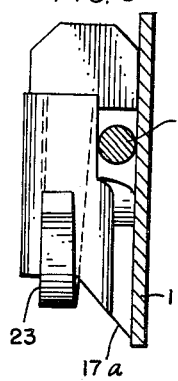
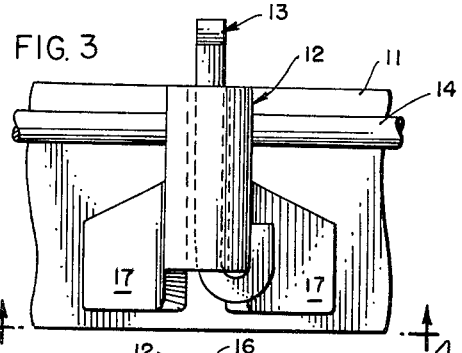
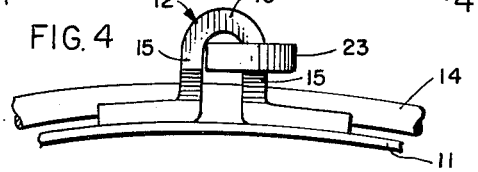
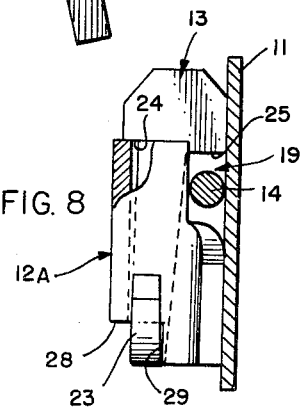
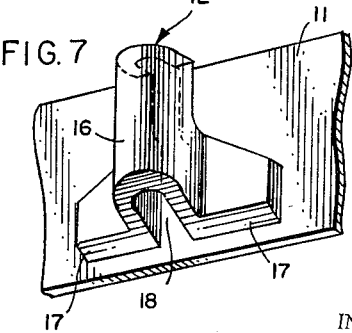
INVENTOR:
PETER C. KESLING
BY
Marshall, Johnston, Cook & Root
ATT'YS

United States Patent Office 3,178,821
Patented Apr. 20, 1965

3,178,821
ORTHODONTIC APPLIANCE
Peter C. Kesling, Green Acres, La Porte, Ind.
Filed Apr. 30, 1962, Ser. No. 191,233
9 Claims. (Cl. 32—14)

This invention relates in general to an orthodontic appliance, and more particularly to an orthodontic bracket adapted for use in securing an arch wire to teeth during the processes of straightening teeth, and still more particularly to an orthodontic bracket and lock pin appliance wherein means is provided on the bracket to space the tail of the lock pin away from the tooth and force the head of the lock pin against the tooth band when the tail is bent over the bracket for securing the pin thereto. Moreover, the orthodontic appliance of the present invention is primarily useful where the light wire differential force technique is employed.

During the treatment of a patient, wherein orthodontic lock pin and bracket appliances are employed for securing the arch wire to the teeth, it is necessary to effect periodic adjustments which necessitate removal of the arch wire and replacing of same. Thus it becomes necessary to remove the lock pins from the brackets during removal of the arch wire. Heretofore, difficulty was encountered in removing the lock pins from the bracket in that the tail of a lock pin often becomes lodged tightly against the tooth band or bracket attaching flanges. Thus in attempting to remove a lock pin, oftentimes the bracket was damaged thereby necessitating replacement of same. Moreover, it has often been difficult to positively position the head of a lock pin against the tooth band when the tail is bent over the end of the bracket.

It is a further object of this invention to obviate the above difficulty and provide an improved orthodontic bracket.

A further object of this invention is in the provision of an orthodontic bracket and lock pin assembly wherein the lock pin is provided with a head and tail, and means is provided on the bracket for spacing the lock pin tail from the tooth band or bracket attaching flange when the tail is bent over the bracket.

A still further object of this invention resides in the provision of an improved orthodontic bracket for receiving a lock pin to secure an arch wire to a tooth, wherein the end of the bracket over which the tail of the lock pin is bent for securing the lock pin in place is notched mesial-distally to cause the tail to be spaced buccally from the tooth band when it is bent over the bracket.

Another object of this invention is to provide an orthodontic bracket for receiving a lock pin to secure an arch wire to a band on a tooth, wherein the end of the bracket over which the tail of the lock pin is bent for securing the lock pin in place is notched mesial-distally and provided with a sloping surface to cause the tail to be cammed buccally and thereby positively position the head of the lock pin against the tooth band.

Other objects, features and advantages of the invention will be apparent from the following detailed disclosure taken in conjunction with the accompanying sheet of drawings, wherein like reference numerals refer to like parts, in which:

FIG. 1 is a perspective view of a tooth having a tooth band mounted thereon and a combination lock pin and bracket assembly mounted on the tooth band wherein the bracket is constructed in accordance with the principles of the present invention;

FIG. 2 is an enlarged elevational view of the bracket of the present invention and showing a lock pin received by the bracket where the tail is in unsecured position;

FIG. 3 is a view similar to FIG. 2 but showing the tail of the lock pin bent over the bracket for securing the lock pin thereto;

FIG. 4 is a bottom plan view of the bracket of FIG. 3 and taken along line 4—4 in the direction of the arrows;

FIG. 5 is a side elevational view of the bracket and pin assembly of FIG. 2;

FIG. 6 is a side elevational view of the bracket and pin assembly of FIG. 3 showing the tail of the pin bent over the bracket, and also showing a modification;

FIG. 7 is a perspective view of a bracket constructed according to the present invention and mounted on a tooth band, and illustrating a modification; and FIG. 8 is a side elevational view of a modified bracket according to the present invention.

Referring now to the drawings, and particularly to FIG. 1, a tooth 10 is shown having a tooth band 11 mounted thereon. An orthodontic bracket constructed according to the present invention is generally indicated by the numeral 12 in mounted relationship on the tooth band 11, and a lock pin 13 is shown as being received by the bracket and for the purpose of securing the arch wire 14 to the tooth band and tooth. The bracket 12 includes an elongated body extending occlusal-gingivally and having parallel opposed side walls 15 that extend buccal-lingually and an end wall 16 extending generally mesial-distally. The lingual ends of the side walls 15 have attaching flanges 17 extending therefrom at substantially right angles and therefore mesial-distally which abut against the tooth band 11. These flanges may be secured to the tooth band in any suitable manner such as by spot welding or the like. The side walls 15, end wall 16 and the tooth band 11 define an occlusal-gingivally extending opening 18 within which is received the lock pin 13.

A mesial-distally extending wire receiving slot 19 is defined at one end of the bracket and along the lingual side by the tooth band 11 and a notched out portion of the side walls 15 which define occlusal-gingivally extending and lingual facing edges 20 and buccal-lingually extending edges 21. The edges 21 normally face gingivally unless the bracket is for some reason mounted on the tooth band 180° relative to that shown in the drawings.

The lock pin 13 is one type that may be employed with the bracket of the present invention wherein it is desired to effect freedom of tipping between the arch wire and the tooth, and includes generally a head 22 and a tail 23. A shoulder 24 is provided on the buccal side of the head to engage the upper end of the bracket and limit the movement of the head into the opening, while a shoulder 25 is provided on the lingual side of the head to coact with the slot 19 and lock the wire in place. This pin is commercially referred to as a safety pin or a safety lock pin, and where it is desired to limit the tipping relationship between the wire and the bracket, a shoulderless pin is provided which would be capable of pulling the wire tightly down onto the edges 21. A shoulderless lock pin would be like the lock pin 13 with the exception of not having the buccal shoulder 24 and therefore would be capable of being drawn deeper into the lock pin opening 18.

In securing the arch wire 14 to the bracket and band, the wire is first inserted into the slot 19, and then the lock pin may be inserted into the opening 18 until it attains the position shown in FIGS. 2 and 5. Thereafter, the tail 23 of the lock pin may be bent over the bracket as shown in FIGS. 1, 3, 4 and 6 to securely lock the pin in place and thereby prevent the wire 14 from escaping the slot 19.

The lower end of the bracket 12 is notched mesial-distally at the buccal side to define, when viewing the bracket from the side as seen in FIGS. 5 and 6, a buccal-lingually extending edge 26 and a sloping edge 27. A portion of the side walls 15 and the end wall 16 define the buccal-lingually extending edge 26, while a portion of the side walls 15 define the sloping edge 27. Thus the sloping edge 27 is defined at the lower ends of each of the side walls and adjacent to the lingual ends of the the side walls. The edge 27 slopes from the edge 26 downwardly and lingually and defines means for effecting the spacing of the tail 23 away from the attaching flanges and tooth band when the tail is bent around the end of the bracket as shown in FIGS. 1, 3, 4 and 6. In drawing the tail 23 of the lock pin to the position shown in FIG. 6 tightly against the buccal-lingually extending edge 26, the lingual side of the tail is cammed or urged buccally by the sloping edge 27 so that it takes the position as shown in FIG. 6 when it is bent over one of the side walls 15. When the tail is being urged buccally, the head 22 is being urged lingually into the position shown in FIG. 6. Thus, the head is positively positioned against the tooth band 11 to properly lock the wire to the tooth and thereby prevent accidental escape of the wire during wearing of the bracket. Thereafter, when it is desired to remove the lock pin from the bracket, access to the end of the tail may be easily had to straighten the tail out so that the pin can then be removed inasmuch as the tail is spaced buccally from the attaching flanges and tooth band.

The bracket of FIG. 6 differs from the bracket of FIG. 5 in that the incisal edges 17a of the attaching flanges 17 are beveled to define a continuation of the sloped edge 27 to the tooth band. Thus a longer sloping edge is defined and the sharp-like incisal or occlusal edge of the bracket in FIG. 5 is eliminated to prevent any possible chance of the tail from engaging and catching on same when it is being bent over the end of the bracket.

The bracket of FIG. 7 differs from the other brackets in that the entire occlusal or incisal edges of the bracket are inclined to effect the purposes herein referred to in spacing the tail end of the pin away from the tooth and forcing the head of the pin into positive wire retention position when bending the pin tail over the occlusal end of the bracket.

A modified bracket 12A is shown in FIG. 8 which differs from the embodiment in FIGS. 1-6 in that the lower end of the bracket is notched in a different manner to define a buccal-lingually extending edge 28 and an occlusal-gingivally extending edge 29, whereby the latter edge serves to space the tail 23 buccally of the attaching flanges and tooth band when it is bent over the edge 28 of the bracket.

It should be further appreciated that the incisal or occlusal edge of one of the side walls 15 may be formed like that of the embodiments of FIGS. 5, 7 and 8, while the incisal or occlusal edge of the other side wall may be conventionally formed and extend parallel and contiguous to the adjacent incisal edge of an attaching flange.

While the bracket illustrated in the drawings and described herein is of the type that is made by metal stamping and forming operations, wherein attaching flanges are provided to secure the brackets to tooth bands, it should be appreciated that the present invention, residing in the provision of means for spacing the tail buccally from the tooth band, could be also applied to the type of bracket that is machined or milled wherein no attaching flanges like that presently shown are employed. By appropriately notching and forming the end of the bracket over which the tail of the lock pin would be bent, it would be possible to practice the present invention on milled brackets.

It will be understood that modifications and variations may be effected without departing from the scope of the novel concepts of the present invention, but it is understood that this application is to be limited only by the scope of the appended claims.

The invention is hereby claimed as follows:

1. In an orthodontic system having a tooth band, a bracket attached to said tooth band, a lock pin and an arch wire, said lock pin securing the arch wire to the bracket, the bracket having an opening extending therethrough and substantially parallel to the tooth band, said lock pin received in said opening, said lock pin having a head and a tail, the head coacting with the band and one end of the bracket to secure said arch wire to the band, the tail being bent over the other end of the bracket and locking the pin thereto, and the improvement being in providing means at said other end of the bracket for spacing the tail away from the band and forcing the head of the pin against the tooth band when the tail is bent over said other end of the bracket.

2. In an orthodontic system having a tooth band, a bracket attached to said tooth band, a lock pin and an arch wire, said lock pin securing the arch wire to the bracket, the bracket having an opening extending therethrough and substantially parallel to the tooth band, said lock pin received in said opening, said lock pin having a head and a tail, the head coacting with the band and one end of the bracket to secure said arch wire to the band, the tail being bent over the one end of the bracket and locking the pin thereto, and the improvement being in providing means for spacing the tail away from the band and forcing the head of the pin against the tooth band when the tail is bent over said other end of said bracket, said means comprising a notch formed at said other end of the bracket in spaced relation from the tooth band.

3. The combination as defined by claim 1 wherein said means comprises an edge facing away from said tooth band against which the tail of the pin abuts.

4. The combination as defined by claim 1, wherein said means comprises a sloping edge facing away from said tooth band against which the tail of the pin abuts.

5. An orthodontic bracket adapted to be mounted on a tooth and to be used with a lock pin for connecting an arch wire to a tooth, said bracket having an elongated body with its longitudinal axis adapted to extend substantially parallel to the longitudinal axis of a tooth and including first and second ends and inner and outer sides, an opening for a lock pin in said body extending along the longitudinal axis thereof having an inlet end at the first end of the body and an outlet end at the second end of the body, a notch adapted to receive an arch wire at the first end and inner side of said body, said notch including a side extending substantially parallel to the longitudinal axis of said body and adapted to face the tooth and be substantially parallel thereto and a side being adapted to be substantially perpendicular to the tooth, attaching means extending from the side of the body adjacent to the tooth and adapted to be secured to the tooth, and means at the second end of said body for causing the tail end of a lock pin received in said opening to be spaced from said attaching means and to force the head end of the lock pin against the tooth when the tail end of the lock pin is bent over said second end of the body.

6. The combination as defined in claim 5, wherein said means at the second end of said body includes a notch at the outer side of the body defining at least one edge adapted to extend substantially normal to the tooth and at least one edge adapted to face away from the tooth and sloping from said first named edge and downwardly and inwardly to the attaching means.

7. An orthodontic bracket as defined in claim 6, wherein the edge of said attaching means adjacent to said sloping edge is beveled to define a continuation of said sloping edge.

8. The combination as defined in claim 5, wherein said means includes an inclined surface at said second end of the bracket camming the tail of the pin away from the tooth band and forcing the head against the tooth band when bending the tail about said second end of the bracket.

9. The combination as defined in claim 5, wherein said means includes a notch at said second end of the bracket having at least one edge adapted to face substantially normal to the tooth and at least one edge adapted to extend substantially parallel to the tooth.

References Cited by the Examiner

UNITED STATES PATENTS

| | | | |
|---|---|---|---|
| 1,142,790 | 6/15 | Angle | 32—14 |
| 1,322,994 | 11/19 | Angle | 32—14 |
| 1,366,628 | 1/21 | Angle | 32—14 |
| 2,716,283 | 8/55 | Atkinson | 32—14 |

RICHARD A. GAUDET, *Primary Examiner.*

ROBERT E. MORGAN, *Examiner.*